(12) United States Patent
Zhou et al.

(10) Patent No.: US 12,496,662 B2
(45) Date of Patent: Dec. 16, 2025

(54) ACTIVE METAL BRAZING PASTE COMPOSITION, BRAZING PASTE, AND METHOD FOR BRAZING CERAMICS AND METALS

(71) Applicant: BYD COMPANY LIMITED, Guangdong (CN)

(72) Inventors: Wei Zhou, Shenzhen (CN); Yiming Zhu, Shenzhen (CN); Qiang Xu, Shenzhen (CN); Wenyan Zhao, Shenzhen (CN); Xiayang Li, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/398,030

(22) Filed: Dec. 27, 2023

(65) Prior Publication Data

US 2024/0123554 A1 Apr. 18, 2024

Related U.S. Application Data

(63) Continuation of application No. PCT/CN2022/120963, filed on Sep. 22, 2022.

(30) Foreign Application Priority Data

Sep. 29, 2021 (CN) .......................... 202111155220.8

(51) Int. Cl.
| | | |
|---|---|---|
| *B23K 35/02* | (2006.01) | |
| *B22F 1/00* | (2022.01) | |
| *B22F 1/103* | (2022.01) | |
| *B23K 1/008* | (2006.01) | |
| *B23K 35/30* | (2006.01) | |
| *B23K 103/00* | (2006.01) | |
| *B23K 103/18* | (2006.01) | |

(52) U.S. Cl.
CPC .............. *B23K 35/025* (2013.01); *B22F 1/09* (2022.01); *B22F 1/103* (2022.01); *B23K 1/008* (2013.01); *B23K 35/3006* (2013.01); *B22F 2301/10* (2013.01); *B22F 2301/255* (2013.01); *B23K 2103/18* (2018.08); *B23K 2103/52* (2018.08)

(58) Field of Classification Search
CPC .............. B23K 35/025; B23K 35/3006; B22F 2301/10; B22F 2301/255; C22C 5/08; C22C 9/00
See application file for complete search history.

(56) References Cited

U.S. PATENT DOCUMENTS

2014/0126155 A1 5/2014 Imamura et al.

FOREIGN PATENT DOCUMENTS

| | | |
|---|---|---|
| CN | 1201241 A | 12/1998 |
| CN | 101288928 A | 10/2008 |
| CN | 101733583 A | 6/2010 |
| CN | 102107340 A | 6/2011 |
| CN | 105537799 A | 5/2016 |
| CN | 106312220 A | 1/2017 |
| CN | 106536125 A | 3/2017 |
| CN | 104496513 B | 10/2017 |
| CN | 107322187 A | 11/2017 |
| CN | 108546095 A | 9/2018 |
| CN | 110436952 A | 11/2019 |
| DE | 102014223365 A1 | 5/2016 |
| EP | 0798779 A1 | 10/1997 |
| JP | H04187574 A | 7/1992 |
| JP | H0524943 A | 2/1993 |
| JP | 2000246482 A | 9/2000 |
| JP | 2000281460 A | 10/2000 |
| JP | 2001148568 A | 5/2001 |
| JP | 2001339155 A | 12/2001 |
| JP | 2005112677 A | 4/2005 |
| JP | 2005252087 A | 9/2005 |
| JP | 4345054 B2 | 10/2009 |
| JP | 2014168811 A | 9/2014 |

OTHER PUBLICATIONS

English Abstract and English Machine Translation of Chen et al. (CN 107322187A) (Nov. 7, 2017).*
English translation of International Search Report from PCT/CN2022/120963 dated Nov. 29, 2022 (3 pages).

* cited by examiner

*Primary Examiner* — Jessee R Roe
(74) *Attorney, Agent, or Firm* — Calfee, Halter & Griswold LLP

(57) ABSTRACT

Disclosed are an active metal brazing paste composition, a brazing paste and a method for brazing ceramics and metals. The composition includes a binder and metal powder. The metal powder includes active metal brazing powder and brazing-aid metal powder. The brazing-aid metal powder contains copper powder and/or copper-silver alloy powder. The active metal brazing powder is alloy powder containing copper, silver, and an active metal. With the total weight of the metal powder as a reference, the content of the active metal is 1.5 wt % or more, the content of silver is 40 wt % to 90 wt %, and the content of oxygen is 0.5 wt % or less.

16 Claims, 2 Drawing Sheets

ACTIVE METAL BRAZING PASTE COMPOSITION, BRAZING PASTE, AND METHOD FOR BRAZING CERAMICS AND METALS

CROSS-REFERENCE TO RELATED APPLICATIONS

The present disclosure is a bypass continuation application of PCT International Application No. PCT/CN2022/120963, filed on Sep. 23, 2022, which claims priority of Chinese Patent Application No. 202111155220.8, filed with China National Intellectual Property Administration on Sep. 29, 2021, and entitled "ACTIVE METAL BRAZING PASTE COMPOSITION, BRAZING PASTE, AND METHOD FOR BRAZING CERAMICS AND METALS". The entire contents of the above-referenced patent disclosures are herein incorporated by reference.

FIELD

The present disclosure relates to the technical field of brazing, and more specifically, to an active metal brazing paste composition, a brazing paste, and a method for brazing ceramics and metals.

BACKGROUND

Currently, active metal brazing is a common method for brazing ceramics to ceramics and metals to ceramics, especially non-oxide ceramics, such as silicon nitride and aluminum nitride. During active metal brazing, brazing material containing active metals such as Ti or Zr is used. These active metals can react with ceramics at a high temperature, increasing the wettability of the brazing material and forming chemical bonds with ceramics. Addition of a binder to the powdered brazing material and subsequent screen-printing onto a brazing interface is a common method of brazing. The binder is formed by mixing different types of organic materials. Prior to reaching the brazing temperature, most of the binder evaporates and leaves the brazing interface. However, a small number of organic materials are decomposed, resulting in carbon residue in the brazing interface, which can affect the brazing quality and subsequent processes. In existing ternary alloy active metal brazing material, the content of active metals is low, and it is difficult to precisely control the content of active metals in ternary alloy products during preparation, which leads to a significant fluctuation of the content of active metals. Due to a significant impact on brazing from the content of active metals, the fluctuation will cause instability of subsequent brazing quality. Furthermore, the existing active metal brazing material have a high silver content, causing an increase in cost of the brazing material.

SUMMARY

An objective of the present disclosure is to solve the problems of carbon remaining in a brazing interface, affecting the brazing quality and subsequent processes, the difficulty in precisely controlling the content of active metals in brazing material, and high costs.

In order to achieve the above objective, in a first aspect, the present disclosure provides an active metal brazing paste composition. The composition includes a binder and metal powder. The metal powder includes active metal brazing powder and brazing-aid metal powder. The brazing-aid metal powder contains copper powder and/or copper-silver alloy powder. The active metal brazing powder is alloy powder containing copper, silver, and an active metal. With the total weight of the metal powder as a reference, the content of the active metal is 1.5 wt % or more, the content of silver is 40 wt % to 90 wt %, and the content of oxygen is 0.5 wt % or less.

In some examples of the present disclosure, with the total weight of the brazing-aid metal powder as a reference, the content of oxygen of the brazing-aid metal powder is 2 wt % or less, the content of carbon of the brazing-aid metal powder is 0.75 wt % or less, and the molar ratio of oxygen to carbon in the brazing-aid metal powder is 2 or more.

In some examples of the present disclosure, with the total weight of the brazing-aid metal powder as a reference, the content of oxygen of the brazing-aid metal powder is 0.3 wt % to 0.5 wt %, and the content of carbon is 0.1 wt % or less.

In some examples of the present disclosure, with the total weight of the metal powder as a reference, the content of the brazing-aid metal powder is 10 wt % to 50 wt %, and the content of the active metal brazing powder is 50 wt % to 90 wt %.

In some examples of the present disclosure, with the total weight of the metal powder as a reference, the content of the active metal is 1.8 wt % to 4.5 wt %; the content of the silver is 42 wt % to 85 wt %; and the content of the oxygen is 0.001 wt % to 0.3 wt %.

In some examples of the present disclosure, with the total weight of the metal powder as a reference, the content of the active metal is 2 wt % to 4 wt %; the content of the silver is 45 wt % to 80 wt %; and the content of the oxygen is 0.06 wt % to 0.2 wt %.

In some examples of the present disclosure, the active metal is selected from one or more of Ti, Zr, and Hf.

In some examples of the present disclosure, the active metal is Ti.

In some examples of the present disclosure, with the total weight of the active metal brazing powder as a reference, the content of the active metal is 1.5 wt % to 10 wt %.

In some examples of the present disclosure, with the total weight of the active metal brazing powder as a reference, the content of the active metal is 2 wt % to 6 wt %.

In some examples of the present disclosure, the weight ratio of Ag to Cu in the active metal brazing powder is 3:7 to 9:1.

In some examples of the present disclosure, the weight ratio of Ag to Cu in the active metal brazing powder is 6:4 to 8:2.

In some examples of the present disclosure, the oxygen content of the active metal brazing powder is 0.5 wt % or less.

In some examples of the present disclosure, the particle size of the active metal brazing powder is 50 μm or less, and the particle size of the brazing-aid metal powder is 50 μm or less.

In some examples of the present disclosure, with the total weight of the composition as a reference, the content of the metal powder is 80 wt % to 95 wt %; and the content of the binder is 5 wt % to 20 wt %.

In some examples of the present disclosure, with the total weight of the composition as a reference, the content of the metal powder is 85 wt % to 90 wt %; and the content of the binder is 10 wt % to 15 wt %.

In a second aspect, the present disclosure provides a brazing paste. The brazing paste is prepared by adopting the active metal brazing paste composition according to the first aspect of the present disclosure.

In a third aspect, the present disclosure provides a method for brazing ceramics and metals by adopting the active metal brazing paste composition according to the first aspect of the present disclosure or the brazing paste according to the second aspect of the present disclosure. The method includes: ceramics to be brazed and metals to be brazed are connected through the composition or the brazing paste to form a connecting member to be brazed, and the connecting member to be brazed is fed into a vacuum brazing furnace to be heated and brazed, where the ratio of the content of organic materials of the connecting member to be brazed to the effective volume of the vacuum brazing furnace is 0.4 g/m³ or less.

In some examples of the present disclosure, the method further includes: the composition or the brazing paste is printed onto the surface of the ceramics to be brazed, and baking is performed at 60° C. to 100° C. for 20 min to 60 min; the metals to be brazed are fixedly connected with the baked brazing paste to obtain the connecting member to be brazed; and the connecting member to be brazed is fed into the vacuum brazing furnace to be heated and brazed, where the ratio of the content of organic materials of the connecting member to be brazed to the effective volume of the vacuum brazing furnace is 0.3 g/m³ or less.

Through the above technical solution, the active metal brazing paste composition according to the present disclosure includes the copper powder and/or the copper-silver alloy powder, and due to the presence of an oxide layer on the surface of copper powder and/or the copper-silver alloy powder, copper is likely to be oxidized and decomposed into oxygen at the brazing temperature, which can consume carbon remaining after decomposition of organic materials in the binder, thereby enhancing the reactivity of the brazing material. The active metal brazing paste composition according to the present disclosure contains the copper powder or silver-copper alloy powder, in addition to the active metal brazing powder, which avoids the difficulty in directly controlling the content of the active metal in alloy powder, and therefore, by adjusting the amount of the copper powder or silver-copper alloy powder in the composition, the total content of the active metal in the brazing paste can be regulated and controlled, thereby stabilizing the brazing quality and reducing influences on the subsequent processes. Meanwhile, the copper powder and the silver-copper alloy powder have low prices, which can reduce the material cost after being added to the brazing paste composition.

The advantages of the examples of the present disclosure will be partially described in the following specification. Some of these advantages may be apparent according to the specification, or may be acquired through the implementation of the examples of the present disclosure.

BRIEF DESCRIPTION OF THE DRAWINGS

The accompanying drawings are intended to provide a further understanding of the present disclosure and constitute a part of this specification. The accompanying drawings and the following specific implementations are used together for explaining the present disclosure rather than limiting the present disclosure. In the accompanying drawings.

DETAILED DESCRIPTION

Figure 1:
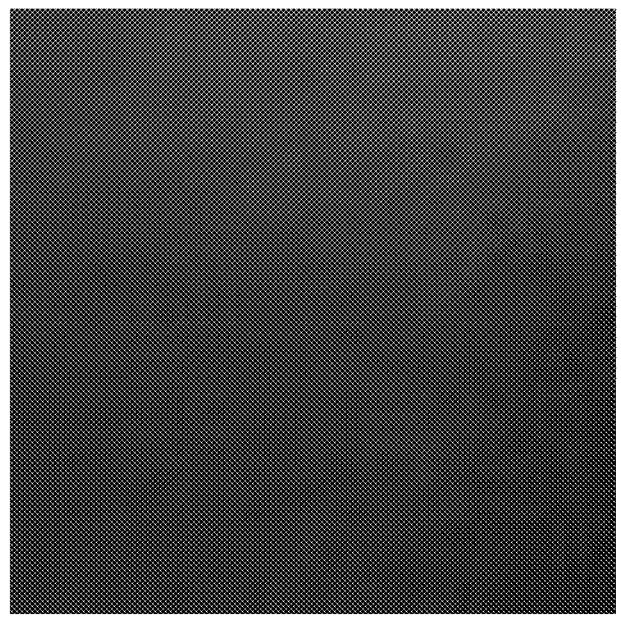
FIG. 1 is an image of an ultrasonic detection at a brazed position of a brazing assembly according to Example 1.

Specific implementations of the present disclosure are described in detail below. It is to be understood that the specific implementations described herein are merely used to describe and explain the present disclosure, but are not intended to limit the present disclosure.

In a first aspect, the present disclosure provides an active metal brazing paste composition, including a binder and metal powder. The metal powder includes active metal brazing powder and brazing-aid metal powder. The brazing-aid metal powder contains copper powder and/or copper-silver alloy powder. The active metal brazing powder is alloy powder containing Cu, Ag, and an active metal. With the total weight of the metal powder as a reference, the content of the active metal is 1.5 wt % or more, the content of silver is 40 wt % to 90 wt %, and the content of oxygen is 0.5 wt % or less.

According to the above technical solution, copper contained in the active metal brazing paste composition according to the present disclosure can be decomposed into oxygen at a brazing temperature, which facilitates the consumption of carbon remaining after the decomposition of the binder, and prevents carbon residues at a brazing interface from affecting the brazing quality. In addition, conventional ternary alloy active metal brazing material have a low content of active metals, and by utilizing conventional preparation methods, it is difficult to precisely control the content of active metals in ternary alloy products. In the brazing paste composition according to the present disclosure, the content of active metal brazing material in the total weight of the composition is adjusted and controlled by introducing the amount of copper powder or silver-copper alloy powder, which can lower the control requirements for the content of active metals in ternary alloys and reduce the difficulty in ternary alloy preparation. By adopting the active metal brazing paste composition according to the present disclosure, the brazing quality can be stabilized, and influences on subsequent brazing processes are reduced. Meanwhile, copper powder and silver-copper alloy powder have low prices, which can reduce the material cost after being added to brazing paste.

In an implementation of the present disclosure, the content of oxygen of metal powder is 0.48 below, or 0.46 wt % below, or 0.01 wt % to 0.5 wt %. In another implementation of the present disclosure, the content of oxygen of metal powder is 0.01 wt % to 0.48 wt %, or 0.01 wt % to 0.46 wt %, or 0.1 wt % to 0.5 wt %, or 0.1 wt % to 0.48 wt %, or 0.1 wt % to 0.46 wt %.

In an implementation, with the total weight of the brazing-aid metal powder as a reference, the content of oxygen of the brazing-aid metal powder is 2 wt % or less, such as 0.3 wt % to 0.5 wt %, which facilitates the reactivity of copper in the brazing process and improves the brazing quality. Further, the content of carbon of the brazing-aid metal powder is 0.75 wt % or less, such as 0.6 wt % or less or 0.5 wt % or less. In another implementation of the present disclosure, the content of carbon of the brazing-aid metal powder is 0.01 wt % to 0.75 wt %, or 0.02 wt % to 0.6 wt %, or 0.05 wt % to 0.5 wt %. In another implementation of the present disclosure, the content of carbon of the brazing-aid metal powder is 0.3 wt % or less, or 0.25 wt % or less, or 0.1 wt % or less, or 0.01 wt % to 0.3 wt %, or 0.01 wt % to 0.25 wt %, or 0.01 wt % to 0.1 wt %, avoiding introduction of excessive oxygen into the brazing paste, which may impact the brazing performance of active metals. The molar ratio of oxygen to carbon in the brazing-aid metal powder is 2 or more, such as 2 to 8, 2 to 6, or 2.2 to 5.6.

In this implementation, the oxygen and carbon content in the brazing-aid metal powder is appropriate, which can prevent the brazing performance of the brazing paste from being affected, thereby further improving the brazing quality.

In an implementation, in order to further improve the brazing performance of the brazing paste composition, with the total weight of the metal powder as a reference, the content of the active metal is 1.8 wt % to 4.5 wt %; the content of the silver is 42 wt % to 85 wt %; and the content of the oxygen is 0.001 wt % to 0.3 wt %. In another implementation of the present disclosure, with the total weight of the metal powder as a reference, the content of the active metal is 2 wt % to 4 wt %; the content of the silver is 45 wt % to 80 wt %; and the content of the oxygen is 0.06 wt % to 0.2 wt %.

In the brazing paste composition according to the present disclosure, there are no particular limitations on the weight ratio of the brazing-aid metal powder to the active metal brazing powder, as long as ensure that the content of active metal, silver, and oxygen in the brazing paste composition meets the above content range requirements. For example, with the total weight of the metal powder as a reference, the content of the brazing-aid metal powder may be 10 wt % to 50 wt %, and the content of the active metal brazing powder may be 50 wt % to 90 wt %. In another implementation of the present disclosure, with the total weight of the metal powder as a reference, the content of the brazing-aid metal powder may be 15 wt % to 40 wt %, and the content of the active metal brazing powder may be 60 wt % to 85 wt %.

In the above implementation, the content of active metal titanium in the brazing paste composition may be maintained within an appropriate range, thereby further enhancing the stability of the brazing quality of the active metal brazing paste composition.

In an implementation, the active metal is selected from one or more of Ti, Zr, and Hf. In some implementations of the present disclosure, the active metal is Ti, that is, the active metal brazing powder is copper-silver-titanium brazing powder; and with the total weight of the active metal brazing powder as a reference, the content of the active metal is 1.5 wt % to 10 wt %. In another implementation of the present disclosure, with the total weight of the active metal brazing powder as a reference, the content of the active metal is 2 wt % to 6 wt %. The weight ratio of Ag to Cu in the active metal brazing powder is 3:7 to 9:1. In another implementation of the present disclosure, the weight ratio of Ag to Cu in the active metal brazing powder is 6:4 to 8:2. In the above implementation, the brazing performance of the active metal brazing powder is further improved, and the brazing quality can be further improved.

In an implementation, the content of oxygen of the active metal brazing powder is 0.5 wt % or less, such as 0.01 wt % to 0.5 wt %, or 0.01 wt % to 0.45 wt %, or 0.02 wt % to 0.4 wt %.

In an implementation, the particle size of the active metal brazing powder is 50 μm or less, and the particle size of the brazing-aid metal powder is 50 μm or less. In this implementation, the particle size of the active metal powder is highly matched with the mesh number of a selected printing screen, thereby further improving the brazing quality.

In an implementation, with the total weight of the brazing paste composition as a reference, the content of the metal powder is 80 wt % to 95 wt %; and the content of the binder is 5 wt % to 20 wt %. In another implementation of the present disclosure, with the total weight of the brazing paste composition as a reference, the content of the metal powder is 85 wt % to 90 wt %; and the content of the binder is 10 wt % to 15 wt %. The binder may be a conventional brazing paste binder in the field, which is not particularly limited in the present disclosure.

In a second aspect, the present disclosure provides a brazing paste. The brazing paste is prepared by adopting the active metal brazing paste composition according to the first aspect of the present disclosure.

In a third aspect, the present disclosure provides a method for brazing CERAMICS AND METALS by adopting the active metal brazing paste composition according to the first aspect of the present disclosure or the brazing paste according to the second aspect of the present disclosure. The method includes: ceramics to be brazed and metals to be brazed are connected through the composition or the brazing paste to form a connecting member to be brazed, and the connecting member to be brazed is fed into a vacuum brazing furnace to be heated and brazed, where the ratio of the content of organic materials of the connecting member to be brazed to the effective volume of the vacuum brazing furnace is 0.4 g/m$^3$ or less.

In an implementation, the method further includes: the composition or the brazing paste is printed onto the surface of ceramics to be brazed, and baking is performed at 60° C. to 100° C. for 20 min to 60 min, and in another implementation, baking is performed at 70° C. to 80° C. for 30 min; metals to be brazed are fixedly connected with the baked brazing paste to obtain a connecting member to be brazed; and the connecting member to be brazed is fed into the vacuum brazing furnace to be heated and brazed, where the ratio of the content of organic materials of the connecting member to be brazed to the effective volume of the vacuum brazing furnace is 0.3 g/m$^3$ or less, and in another implementation, the ratio of the content of organic materials of the connecting member to be brazed to the effective volume of the vacuum brazing furnace is 0.2 g/m$^3$ or less, such that the organic materials are rapidly discharged, thereby further improving the performance of the brazing paste during brazing.

In an implementation, prior to the brazing process, copper powder in the brazing-aid metal powder is subjected to thermal oxidation treatment to avoid the impact of a passivation layer of the copper powder on the brazing quality; and according to the method of the thermal oxidation treatment, the copper powder is heated in air or oxygen to be oxidized.

In an implementation, the brazing process is divided into 5 stages based on different temperature points, and the temperature points for division are determined according to a melting point of active metal powder of brazing paste. The 5 stages include:

1. A temperature rise stage from the room temperature 25° C. to a temperature range of 10° C. to 100° C. below the melting point of the active metal powder, such as a temperature rise stage from the room temperature 25° C. to a temperature range of 35° C. to 65° C. below the melting point of the active metal powder.
2. A heat preservation stage at the melting point of the active metal powder.

3. A temperature rise stage from the melting point of the active metal powder to a brazing temperature, the brazing temperature being not lower than 50° C. above an equivalent melting point and not higher than 20° C. below the melting point of a member to be brazed.
4. A heat preservation stage at the brazing temperature.
5. A subsequent cooling stage.

In an implementation, the method adopted in the brazing process includes:

vacuum pumping is performed after furnace charging, and after the vacuum degree is less than 0.1 pa, heating is started to enter the first stage. The heating rate at the first stage is lower than 10° C./min before the temperature reaches 200° C. After the temperature exceeds 200° C., the temperature may be increased at a fixed rate or different rates, or heat preservation may be performed at a certain temperature to ensure that the average heating rate is lower than 5° C./min and the maximum rate is lower than 10° C./min. By adjusting the heating speed, with the temperature rise and heat preservation methods, it is ensured that the maximum air pressure does not exceed 0.1 pa, and the temperature at the maximum air pressure does not exceed the highest temperature at the first stage. The heat preservation time at the second stage is 10 min to 40 min. The average heating rate at the third stage is lower than 5° C./min, and the temperature rise duration does not exceed 90 min. The heat preservation time at the fourth stage is 30 min to 120 min. At the fifth stage, the cooling rate is lower than 5° C./min before the temperature reaches 600° C. After the temperature reaches 600° C., the temperature is no longer controlled, and natural cooling is performed.

The present disclosure is further described in detail through following examples. Raw materials used in the examples can be obtained through commercial purchasing approaches.

Example 1

The composition of active metal brazing powder by weight is: 70 wt % of Ag, 4 wt % of Ti, the particle size being 50 μm or less, 0.08 wt % of oxygen, and the balance copper.

Brazing-aid metal powder is copper powder, the particle size of the copper powder is 50 μm or less, the content of oxygen is 0.2 wt %, the content of carbon is 0.05 wt %, and the copper powder is subjected to thermal oxidation treatment, thereby increasing the content of oxygen to 0.45 wt %.

Metal powder is composed of 80 wt % of active metal brazing powder and 20 wt % of brazing-aid metal powder, and a brazing paste is prepared by adding a binder. With the total weight of the brazing paste composition as a reference, the content of the binder is 15 wt %. When the binder evaporates separately, 2.3 wt % of materials remain at 400° C. during heating. The adopted binder includes components: 71.5 wt % of terpinenol, 8 wt % of stearic acid, 8 wt % of polyethylene glycol 600, 4 wt % of polyethylene glycol 2000, 2.5 wt % of EC-90-110, 5 wt % of oxalic acid, and 1 wt % of polyurethane wax 6650.

The brazing paste is printed on silicon nitride ceramics and dried at 90° C. for 30 min. The remaining organic materials account for 0.9 wt % of the remaining brazing paste. A copper plate is placed on the brazing paste, and after assembly, the brazing paste with the copper plate is fed into the vacuum brazing furnace to be heated and brazed. The ratio of the content of the organic materials remaining on a brazing assembly loaded into the furnace to the effective volume of the brazing furnace is 0.1 g/m$^3$.

The brazing process is as follows: vacuum pumping is performed after furnace charging, and after the vacuum degree is less than 0.1 pa, heating is started to enter the first stage. The heating rate at the first stage is 5° C./min before the temperature reaches 200° C. After the temperature exceeds 200° C., the temperature is increased to 740° C. at the fixed rate of 3° C./min. The maximum air pressure is 0.06 pa, and the temperature at the maximum air pressure is 465° C. At the second stage, the heat preservation time at 740° C. is 25 min. At the third stage, the temperature is increased to 890° C. at 3° C./min. At the fourth stage, the heat preservation time at 890° C. is 45 min. At the fifth stage, cooling is performed to 600° C. at 2° C./min, and after the temperature reaches 600° C., the temperature is no longer controlled, and natural cooling is performed. An image of an ultrasonic detection at a brazed position of the brazing assembly is shown in FIG. 1.

Example 2

The brazing process is the same as Example 1. The difference is that the composition of active metal brazing powder by weight is: 70 wt % of Ag, 3 wt % of Ti, 0.08 wt % of oxygen, and the balance Cu.

Example 3

The brazing process is the same as Example 1. The difference is that brazing-aid metal powder is silver-copper alloy powder, the particle size of the silver-copper alloy powder is 50 μm or less, the content of silver is 50 wt %, the content of oxygen is 0.2 wt %, the content of carbon is 0.05 wt %, the balance is Cu, and the silver-copper powder is subjected to thermal oxidation treatment, thereby increasing the content of oxygen to 0.45 wt %.

Example 4

The brazing process is the same as Example 1. The difference is that the composition of active metal brazing powder by weight is: 70 wt % of Ag, 4 wt % of Ti, 0.4 wt % of oxygen, and the balance Cu.

Example 5

The brazing process is the same as Example 1. The difference is that the composition of active metal brazing powder by weight is: 70 wt % of Ag, 4 wt % of Zr, with the particle size being 50 μm or less, 0.08 wt % of oxygen, and the balance Cu.

Comparative Example 1

Figure 2:
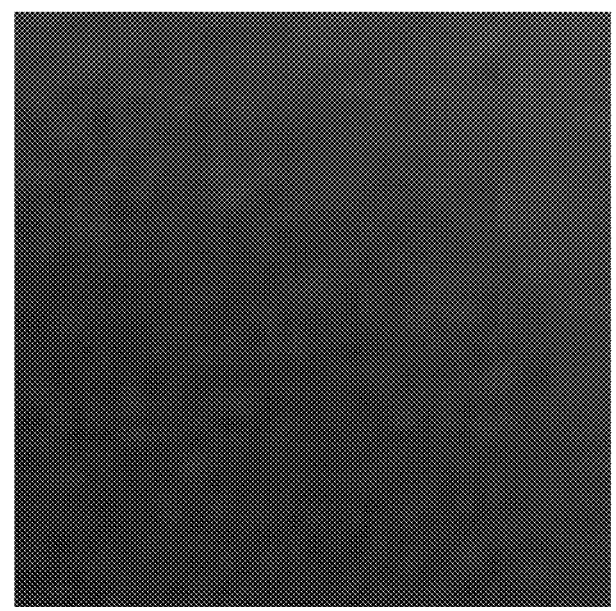
FIG. 2 is an image of an ultrasonic detection at a brazed position of a brazing assembly according to Comparative Example 1.

The brazing process is the same as Example 1. The difference is that metal powder only contains active metal brazing powder and does not contain brazing-aid metal powder, and a brazing paste is prepared by adding a binder. An image of an ultrasonic detection at a brazed position of the brazing assembly is shown in FIG. 2.

Comparative Example 2

The brazing process is the same as Example 1. The difference is that the composition of active metal brazing powder by weight is: 70 wt % of Ag, 4 wt % of Ti, with the particle size being 50 μm or less, 0.8 wt % of oxygen, and the balance Cu.

Figure 3:
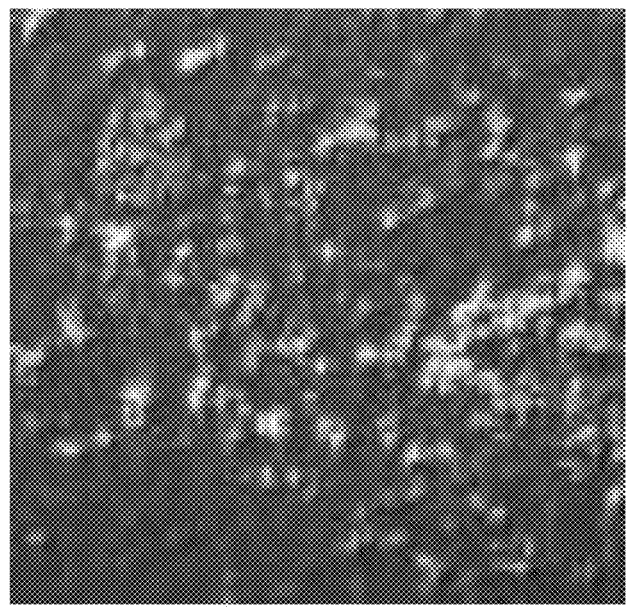
FIG. 3 is an image of an ultrasonic detection at a brazed position of a brazing assembly according to Comparative Example 2.

Brazing-aid metal powder is copper powder, the particle size of the copper powder is 50 μm or less, the content of oxygen is 3 wt %, and the content of carbon is 1 wt %. An image of an ultrasonic detection at a brazed position of the brazing assembly is shown in FIG. 3.

Comparative Example 3

The brazing process is the same as Example 1. The difference is that the composition of active metal brazing powder by weight is, 70 wt % of Ag, 2 wt % of Ti, with the particle size being 50 μm or less, 0.8 wt % of oxygen, and the balance Cu; and
metal powder is composed of 30 wt % of active metal brazing powder and 70 wt % of brazing-aid metal powder.

Comparative Example 4

Figure 4:
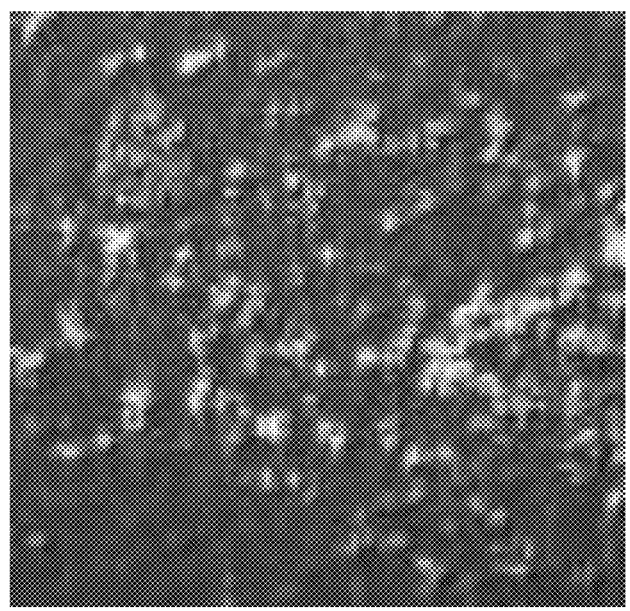
FIG. 4 is an image of an ultrasonic detection at a brazed position of a brazing assembly according to Comparative Example 4.

The brazing process is the same as Example 1. The difference is that metal powder is composed of 30 wt % of active metal brazing powder and 70 wt % of brazing-aid metal powder, and a brazing paste is prepared by adding a binder. An image of an ultrasonic detection at a brazed position of the brazing assembly is shown in FIG. 4.

Comparative Example 5

The brazing process is the same as Example 1. The difference is that the ratio of the content of the organic materials remaining on a brazing assembly loaded into the furnace to the effective volume of the brazing furnace is 0.8 g/m$^3$.

Test Example

A peel strength testing device is a universal testing machine. Testing software is QCTech-A3, the peeling speed is 50 mm/min, and the peeling distance is greater than 25 mm.

TABLE 1

Peel strength of brazing paste for Examples 1 to 5 and Comparative Examples 1 to 5.

| | Example 1 | Example 2 | Example 3 | Example 4 | Example 5 | Comparative Example 1 | Comparative Example 2 | Comparative Example 3 | Comparative Example 4 | Comparative Example 5 |
|---|---|---|---|---|---|---|---|---|---|---|
| Total content of oxygen in metal powder (wt%) | 0.15 | 0.15 | 0.15 | 0.41 | 0.15 | 0.08 | 1.24 | 0.555 | 0.555 | 0.15 |
| Total content of titanium in metal powder (wt%) | 3.2 | 2.4 | 3.2 | 3.2 | 3.2 (Zr) | 4 | 3.2 | 1.4 | 2.1 | 3.2 |
| Total content of Ag in metal powder (wt%) | 56 | 56 | 66 | 56 | 56 | 70 | 56 | 21 | 21 | 56 |
| Peel strength N/mm | >20 | >20 | >20 | 10-20 | >20 | 10-20 | <10 | <10 | <10 | <10 |
| Ultrasonic detection | Brazing is dense without voids | Brazing is dense without voids | Brazing is dense without voids | Brazing is dense without voids | Brazing is dense without voids | Brazing is dense without voids | Voids exist | Voids exist | Voids exist | Voids exist |

According to the analysis of the data in Table 1, by comparing the data in Examples 1 to 5 and Comparative Examples 1 to 5, it is observed that copper powder is added in metal powder in the brazing paste prepared in the present disclosure, which can reduce the usage amount of ternary alloy brazing powder and lower the material cost of the brazing paste. In addition, compared to an existing brazing paste that only contains ternary alloy brazing powder, the brazing paste according to the present disclosure exhibits comparable or better brazing quality and peel strength. By comparing the data in Example 1 and Example 4, it is observed that in the present disclosure, the brazing paste exhibits better brazing performance when the oxygen content in metal powder is 0.06 wt % to 0.2 wt %; and by comparing the data in Example 1 and Example 5, it is observed that when the ratio of the content of organic materials of the connecting member to be brazed to the effective volume of the vacuum brazing furnace is 0.4 g/m$^3$ or less, the brazing performance of the brazing paste can be further enhanced.

The foregoing examples show only several implementations of the present disclosure and are specifically described in detail, but are not to be construed as a limitation to the patent scope of the present disclosure. It is to be noted that those of ordinary skill in the art may also make several transformations and improvements without departing from the concept of the present disclosure, and these transformations and improvement fall within the scope of protection of the present disclosure. Therefore, the scope of protection of the patent of the present disclosure shall be subject to the appended claims.

What is claimed is:

1. An active metal brazing paste composition, wherein the composition comprises a binder and metal powder;
the metal powder comprises active metal brazing powder and brazing-aid metal powder; the brazing-aid metal powder comprises copper powder and/or copper-silver alloy powder; and the active metal brazing powder is alloy powder comprising copper, silver, and an active metal; and
with a total weight of the metal powder as a reference, a content of the active metal is 1.5 wt % or more, a content of silver is 40 wt % to 90 wt %, and a content of oxygen is 0.5 wt % or less,
wherein with a total weight of the brazing-aid metal powder as a reference, a content of oxygen of the brazing-aid metal powder is 2 wt % or less, a content of carbon of the brazing-aid metal powder is 0.75 wt % or less, and a molar ratio of oxygen to carbon in the brazing-aid metal powder is 2 or more.

2. The brazing paste composition according to claim 1, wherein with a total weight of the brazing-aid metal powder as a reference, a content of oxygen of the brazing-aid metal powder is 0.3 wt % to 0.5 wt %, and a content of carbon of the brazing-aid metal powder is 0.1 wt % or less.

3. The brazing paste composition according to claim 1, wherein with the total weight of the metal powder as a reference, a content of the brazing-aid metal powder is 10 wt % to 50 wt %, and a content of the active metal brazing powder is 50 wt % to 90 wt %.

4. The brazing paste composition according to claim 1, wherein with the total weight of the metal powder as a reference, the content of the active metal is 1.8 wt % to 4.5 wt %; a content of the silver is 42 wt % to 85 wt %; and a content of the oxygen is 0.001 wt % to 0.3 wt %.

5. The brazing paste composition according to claim 1, wherein with the total weight of the metal powder as a reference, the content of the active metal is 2 wt % to 4 wt %; a content of the silver is 45 wt % to 80 wt %; and a content of the oxygen is 0.06 wt % to 0.2 wt %.

6. The brazing paste composition according to claim 1, wherein the active metal is selected from one or more of Ti, Zr and Hf.

7. The brazing paste composition according to claim 1, wherein the active metal is Ti.

8. The brazing paste composition according to claim 1, wherein with a total weight of the active metal brazing powder as a reference, the content of the active metal is 1.5 wt % to 10 wt %.

9. The brazing paste composition according to claim 1, wherein with the total weight of the active metal brazing powder as a reference, the content of the active metal is 2 wt % to 6 wt %.

10. The brazing paste composition according to claim 1, wherein a weight ratio of Ag to Cu in the active metal brazing powder is 3:7 to 9:1.

11. The brazing paste composition according to claim 1, wherein a weight ratio of Ag to Cu in the active metal brazing powder is 6:4 to 8:2.

12. The brazing paste composition according to claim 1, wherein a content of oxygen of the active metal brazing powder is 0.5 wt % or less.

13. The brazing paste composition according to claim 1, wherein a particle size of the active metal brazing powder is 50 μm or less, and the particle size of the brazing-aid metal powder is 50 μm or less.

14. The brazing paste composition according to claim 1, wherein with a total weight of the brazing paste composition as a reference, a content of the metal powder is 80 wt % to 95 wt %; and a content of the binder is 5 wt % to 20 wt %.

15. The brazing paste composition according to claim 1, wherein with a total weight of the brazing paste composition as a reference, a content of the metal powder is 85 wt % to 90 wt %; and a content of the binder is 10 wt % to 15 wt %.

16. A brazing paste, wherein the brazing paste is prepared by adopting the active metal brazing paste composition according to claim 1.

* * * * *